(12) United States Patent
Clifford

(10) Patent No.: US 10,318,203 B1
(45) Date of Patent: Jun. 11, 2019

(54) DUPLICATION BETWEEN DISPARATE DEDUPLICATION SYSTEMS

(71) Applicant: Veritas Technologies LLC, Mountain View, CA (US)

(72) Inventor: Thomas G. Clifford, Edina, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 15/953,608

(22) Filed: Apr. 16, 2018

Related U.S. Application Data

(63) Continuation of application No. 15/363,902, filed on Nov. 29, 2016, now Pat. No. 9,946,486.

(51) Int. Cl.
*G06F 11/14* (2006.01)
*G06F 3/06* (2006.01)

(52) U.S. Cl.
CPC ............ *G06F 3/0641* (2013.01); *G06F 3/067* (2013.01); *G06F 3/0608* (2013.01); *G06F 11/1456* (2013.01)

(58) Field of Classification Search
None
See application file for complete search history.

(56) References Cited

U.S. PATENT DOCUMENTS

| 9,813,248 | B2* | 11/2017 | Bashyam | G06F 11/1004 |
| 2014/0201169 | A1* | 7/2014 | Liu | G06F 3/0608 707/692 |
| 2015/0046409 | A1* | 2/2015 | Sharma | G06F 3/0608 707/692 |
| 2016/0224610 | A1* | 8/2016 | Guyot | G06F 21/64 |

* cited by examiner

*Primary Examiner* — Brian R Peugh
(74) *Attorney, Agent, or Firm* — Campbell Stephenson LLP

(57) ABSTRACT

Disclosed herein are methods, systems, and processes to improve the duplication of data between disparate deduplication systems. Source fingerprints are generated for data blocks using a source fingerprint algorithm at a source deduplication system. The source fingerprints and previously-generated source fingerprints are used to determine whether the data blocks are new or modified. If the data blocks are new or modified, target fingerprints are generated for the data blocks using a target fingerprint algorithm associated with a target deduplication system. The target fingerprints are sent to the target deduplication system.

20 Claims, 9 Drawing Sheets

DUPLICATION BETWEEN DISPARATE DEDUPLICATION SYSTEMS

CROSS-REFERENCE TO RELATED APPLICATIONS

The present patent application is a continuation of U.S. patent application Ser. No. 15/363,902, filed on Nov. 29, 2016, now U.S. Pat. No. 9,946,486, entitled "DUPLICATION BETWEEN DISPARATE DEDUPLICATION SYSTEMS" which is incorporated by reference herein in its entirety and for all purposes.

FIELD OF THE DISCLOSURE

This disclosure is related to deduplication backup systems. In particular, this disclosure is related to duplication between disparate deduplication systems.

DESCRIPTION OF THE RELATED ART

A fingerprinting algorithm is an algorithm that maps a file, data segments, or other unit of data to a more compact representation (e.g., resulting in a unique file identifier and/or data segment fingerprints, or the like). A fingerprint uniquely identifies the file and/or the file's data segments, and is typically used to avoid unnecessary storage, comparison, or transmission of excessive amounts of data. For example, a backup server can check whether a file has been modified by retrieving one or more fingerprint(s) and comparing the retrieved fingerprint(s) with a previously backed-up copy. Therefore, fingerprint(s) may be used for data deduplication.

Different deduplication systems can use different native fingerprint methodologies or algorithms. For example, a source deduplication system might use Message-Digest Algorithm 5 (MD5) fingerprint algorithm, whereas a target deduplication might use Secure Hash Algorithm 256 (SHA-256) fingerprint algorithm.

Optimizing the duplication of deduplicated data between such deduplication systems requires both deduplication systems to use the same fingerprint methodology or algorithm. If not, deduplicated data must be rehydrated using the source fingerprint algorithm, and then re-deduplicated using the target fingerprint algorithm. Obviously, such data migration is resource intensive, cumbersome, and inefficient.

SUMMARY OF THE DISCLOSURE

Disclosed herein are methods, systems, and processes to duplicate data between disparate deduplication systems. One such method involves generating, at a source deduplication system, source fingerprints for data blocks using a source fingerprint algorithm, and determining whether the data blocks are new or modified using the source fingerprint(s) generated for the data block(s) and previously-generated source fingerprints.

In this example, if a determination is made that the data blocks, or a subset thereof, are new or modified, the method generates target fingerprints for these new or modified data blocks using a target fingerprint algorithm associated with a target deduplication system, and sends the target fingerprint(s) to the target deduplication system.

In one embodiment, the method receives a request from the target deduplication system for one or more of the data blocks that are new or modified. Based on the request, the method sends the one or more of the data blocks that are new or modified to the target deduplication system.

In some embodiments, the previously-generated source fingerprints are generated using the source fingerprint algorithm, and the source fingerprint algorithm and the target fingerprint algorithm are different from one another.

In other embodiments, the method determines a reference count of the data blocks, and sends the reference count of the data blocks to the target deduplication system as part of sending the one or more of the data blocks that are new or modified.

In certain embodiments, the method accesses the target fingerprint algorithm associated with the target deduplication system from a computing system communicatively coupled to the source deduplication system, or receives the target fingerprint algorithm associated with the target deduplication system from the target deduplication system.

In one embodiment, the data blocks are deduplicated by the source deduplication system prior to the generation of the target fingerprint for one or more of the data blocks.

In certain embodiments, the method determines whether the data blocks have been previously sent to the target deduplication system.

In other embodiments, the method converts or translates the source fingerprint for one or more of the data blocks that are new or modified to the target fingerprint generated using the target fingerprint algorithm associated with the target deduplication system.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
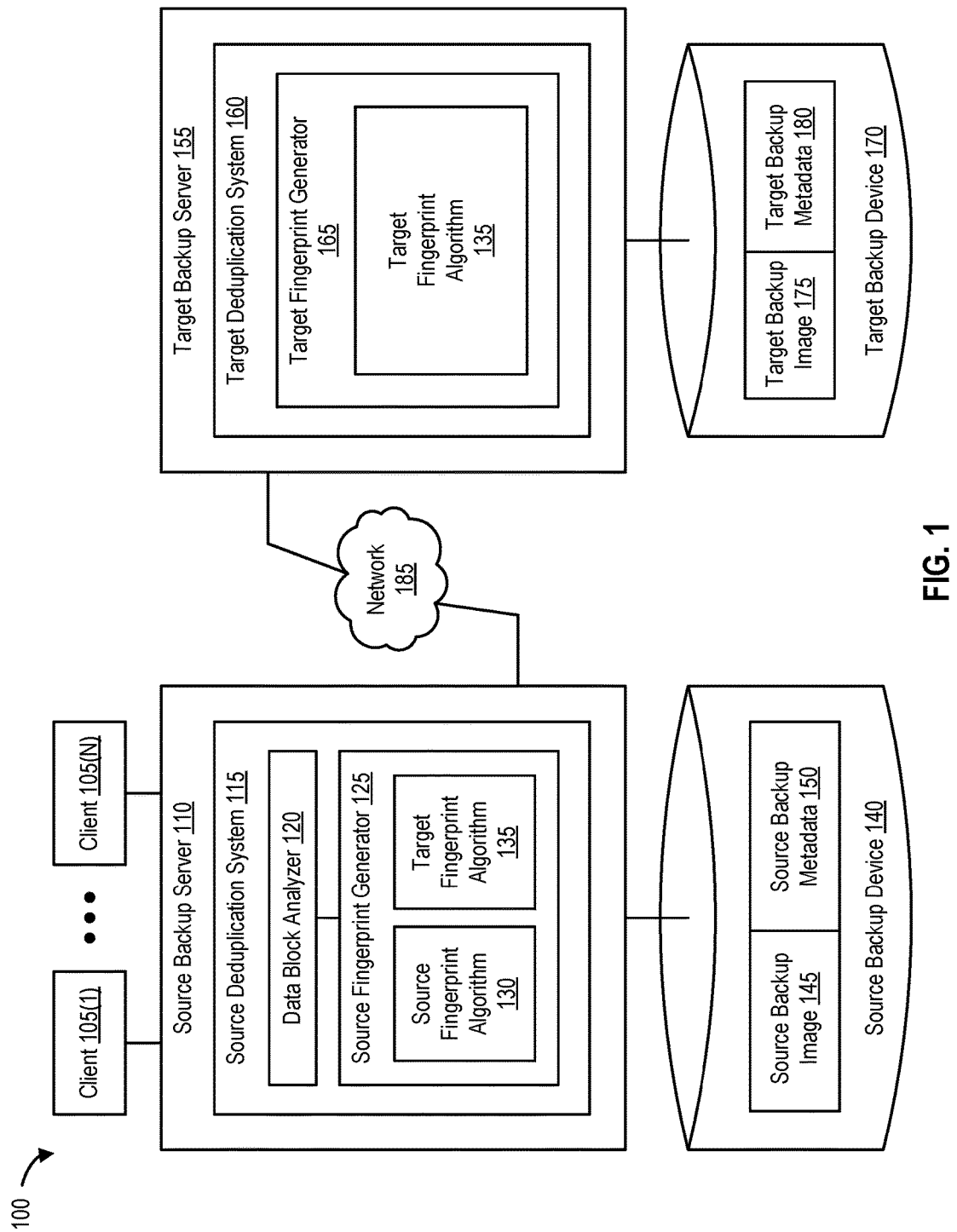
FIG. 1 is a block diagram of a computing system 100 that performs duplication between disparate deduplication systems, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A fingerprinting algorithm is an algorithm that maps a larger data item (e.g., a computer file, data segment, or other unit of data) to a smaller value. The smaller value is sometimes referred to as the "fingerprint" of the data item. The fingerprint uniquely identifies the data item. During a backup, clients and/or computing systems can duplicate data within a set of data to be backed up. In addition, if a set of data is backed up multiple times, data that is unchanged or unmodified also results in duplicates of previously backed up data. In order to prevent backing up duplicate data from a client or multiple clients, backup systems can implement deduplication, which is a process for removing duplicate copies of data. Deduplication preserves storage space when backing up data from client systems. Data deduplicated by a source deduplication system can then be duplicated to a target deduplication system for disaster recovery purposes and the like.

Fingerprints may be used for data deduplication purposes, and so avoid the need for comparison and transmission of excessive amounts of data. For example, backup servers can check whether a file has been modified by retrieving only the file's fingerprint (instead of the entire file), and comparing the retrieved fingerprint with that of a previously-retrieved copy of the file. Thus, matching fingerprints in such a situation obviates the need to transfer the files. A fingerprint can also be a value generated for a given data segment. Typically, such fingerprint values are unique to each data segment, and thus distinguish data segments from one another. An example implementation of a fingerprint is a hash value. For example, hashing algorithms (also called fingerprinting algorithms) such as Rabin's Algorithm, Message-Digest Algorithm 5 (MD5), and Secure Hash Algorithm 512 (SHA-512), and the like, can be used to generate hash values.

As previously noted, different deduplication systems may use and implement different native fingerprint methodologies or algorithms for data deduplication. For example, a source deduplication system might use the MD5 fingerprint algorithm, whereas a target deduplication might use the SHA-256 or the SHA-512 fingerprint algorithm. Duplicating deduplicated data between such disparate deduplication systems presents unique challenges.

Optimized duplication between deduplication systems involves a source deduplication system sending a query to a target deduplication system to determine whether the target deduplication system has data fingerprinted by the source deduplication system. If the target (or destination) deduplication system has the data fingerprinted by the source deduplication system, then this data is not transferred (or migrated) by the source deduplication system during the optimized duplication process. However, this process works only if the source and target deduplication systems calculate or determine fingerprint values using the same fingerprint algorithm or methodology. If the source and target deduplication systems use different fingerprint algorithms or methodologies, optimized duplication does not work and regular (e.g., hydrated) duplication must occur.

In addition, requiring the modification of source and/or target deduplication systems in order to change the native (e.g., internal) deduplication implementations employed is cumbersome and cost ineffective, particularly if more than one such change becomes necessary. Disclosed herein are methods, systems, and processes to perform duplication between disparate deduplication systems without requiring such deduplication systems to change their own native (internal) deduplication implementations.

Example Computing Systems to Duplicate Data Between Disparate Deduplication Systems FIG. 1 is a block diagram of a computing system 100 that can be configured to perform duplication or data migration between disparate deduplication systems, according to one embodiment. As shown in FIG. 1, clients 105(1)-(N) generate data that is deduplicated by source deduplication system 115 implemented in source backup server 110. Clients 105(1)-(N) and source backup server 110 can be any of a variety of different types of computing devices, including a server, personal computing device, laptop computer, cellular phone, or the like. Source backup server 110 is communicatively coupled to target backup server 155 via network 185. It will be appreciated that any type of network and/or interconnection other than network 185 (e.g., the Internet, a Local Area Network (LAN), and the like) can be used to facilitate communication between source deduplication system 115 and target deduplication system 160.

As shown in FIG. 1, source deduplication system 115 includes a data block analyzer 120 and a source fingerprint generator 125. Data block analyzer 120 analyzes data received from clients 105(1)-(N) (e.g., in the form of data segments or data blocks). For example, data block analyzer 120 can determine whether certain data blocks, data segments, or other units of data received from clients 105(1)-(N) are new or modified.

Source fingerprint generator 125 further implements a source fingerprint algorithm 130 and uses a target fingerprint algorithm 135. In this example, source fingerprint algorithm 130 is a native (or internal) fingerprint algorithm or methodology implemented by source deduplication system 115. In some embodiments, source fingerprint generator 125 can use more than one (non-native) target fingerprint algorithm (e.g., target fingerprint algorithms or methodologies associated with various different target deduplication systems).

Source deduplication system 115 is communicatively coupled to a source backup device 140. Source backup device 140 stores data backed up and deduplicated by source deduplication system 115 in the form of a source backup image 145. Source backup device 140 also includes source backup metadata 150. Source backup metadata 150 contains information regarding data in source backup image 145 (e.g., the association between data blocks in source backup image 145 and one or more data objects such as files, and the like). Similarly, target deduplication system 160 is communicatively coupled to a target backup device 170. Target backup device 170 stores data duplicated by source deduplication system 115 to target deduplication system 160 in the form of a target backup image 175. Target backup device 170 also includes target backup metadata 180. Target backup metadata 180 contains information regarding data in target backup image 175.

It will be appreciated that source backup device 140 and target backup device 170 can include one or more of a variety of different storage devices, including hard disks, compact discs, digital versatile discs, one or more solid state drives (SSDs) memory such as Flash memory, and the like, or one or more logical storage devices such as volumes implemented on one or more such physical storage devices.

Figure 2:
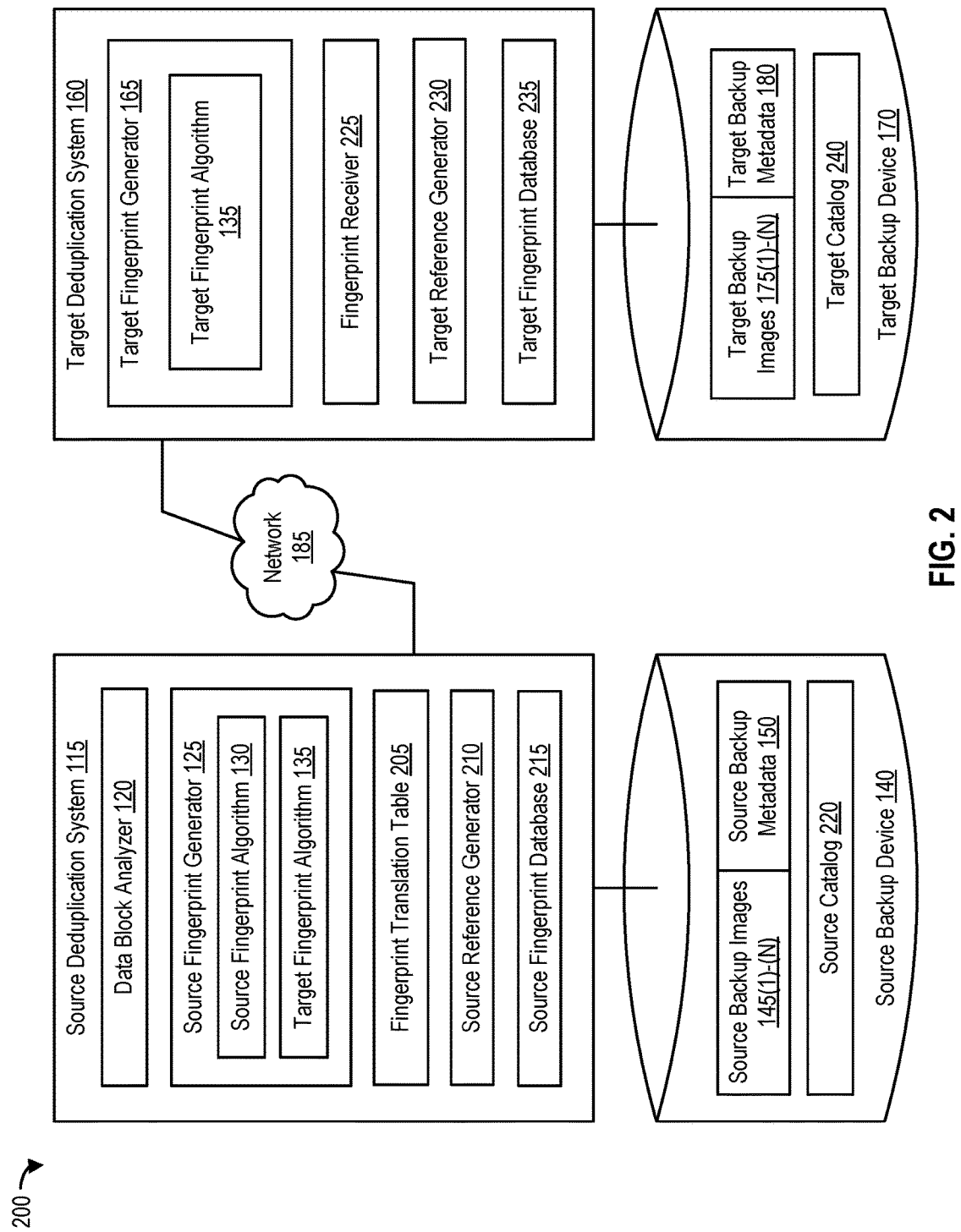
FIG. 2 is a block diagram of a computing system 200 that performs duplication between disparate deduplication systems, according to one embodiment of the present disclosure.

FIG. 2 is a block diagram of a computing system 200 that performs duplication between disparate deduplication systems, according to one embodiment. As shown in FIG. 2, in addition to data block analyzer 120 and source fingerprint generator 125, source deduplication system 115 also implements and includes a fingerprint translation table 205, a source reference generator 210, and a source fingerprint database 215. In addition, source backup device 140 stores multiple source backup images 145(1)-(N), as well as a source catalog 220.

Source fingerprint generator 125 generates source fingerprints for data blocks received from clients 105(1)-(N) using source fingerprint algorithm 130 and stores these source fingerprints in source fingerprint database 215. As noted, source fingerprint algorithm 130 is a native or internal fingerprint algorithm implemented by source deduplication system 115 and is used to deduplicate data received from clients 105(1)-(N).

Source deduplication system 115 can receive target fingerprint algorithm 135 (or an identifier thereof) from target deduplication system 160, or can access target fingerprint algorithm 135 from some other computing system, database, storage device, and the like, that is part of network 190 (possibly using such an identifier). Target fingerprint algorithm 135 is a native or internal fingerprint algorithm implemented by target deduplication system 160 and is different than source fingerprint algorithm 130. Therefore, target fingerprint algorithm 135 can be considered non-native to source deduplication system 160 and thus, cannot be used by source deduplication system 160 to deduplicate data received from clients 105(1)-(N).

Also as shown in FIG. 2, and in addition to target fingerprint generator 165, target deduplication system 160 includes a fingerprint receiver 225, a target reference generator 230, and a target fingerprint database 235. Fingerprint receiver 225 receives target fingerprints generated on the fly by source fingerprint generator 125 using target fingerprint algorithm 135, and determines whether those (received) target fingerprints are present in target fingerprint database 235. In addition, target backup device 170 stores multiple target backup images 175(1)-(N), as well as a target catalog 240. Target backup images 175(1)-(N) contain data duplicated to target deduplication 160 by source deduplication system 115.

In one embodiment, source fingerprint generator 125 generates source fingerprints at source deduplication system 115 for data blocks (e.g., received from clients 105(1)-(N)) using source fingerprint algorithm 130. Data block analyzer 120 then determines whether the data blocks are new or modified, using the source fingerprints generated for the data blocks and previously-generated source fingerprints. For example, data block analyzer 120 can compare the source fingerprint generated for each data block (e.g., by source fingerprint generator 125 using source fingerprint algorithm 130) with previously-generated source fingerprints (e.g., also generated using source fingerprint algorithm 130) in source fingerprint database 215 to determine whether one or more of the newly generated source fingerprints match previously-generated fingerprints in source fingerprint database 215. In this manner, data block analyzer 120 can determine whether a given data block is new or modified (obviously, the opposite could be determined, in the alternative, such that a determination as to whether or not a data block were existing and unchanged could be made).

In some embodiments, if a determination is made that a given data block is new or modified (e.g., the source fingerprint generated for the data block using source fingerprint algorithm 130 does not match previously-generated fingerprints in source fingerprint database 215), source fingerprint generator generates a target fingerprint for the data block using target fingerprint algorithm 135. In some examples, source fingerprint generator 210 then sends the target fingerprint for the data block directly to target deduplication system 160. In other examples, source fingerprint generator 210 creates and populates fingerprint translation table 205 with the target fingerprint, and sends fingerprint translation table 205 to target deduplication system 160. In certain embodiments, fingerprint receiver 225 receives one or more target fingerprints generated by source fingerprint generator 125 using target fingerprint algorithm 135. Fingerprint receiver 225 then determines whether the (received) target fingerprints (e.g., for one or more new or modified data blocks) are part of target fingerprint database 235. If the target fingerprint(s) received from source deduplication 115 are not part of target fingerprint database 235, target deduplication system 160 sends a request to source deduplication system 115 for data block(s) associated with those target fingerprint(s) that are not part of target fingerprint database 235. Such a request can be sent by target deduplication system 160 in various manners.

In one example, target deduplication system 160 can simply return the target fingerprint(s) sent by source deduplication system 115 to source deduplication system 115 if those target fingerprint(s) are not part of target fingerprint database 235. In this case, source deduplication 115 can identify and send the data block(s) that correspond to the target fingerprint(s) sent back by target deduplication system 160. In another example, target deduplication system 160 can identify the data block that corresponds to a particular target fingerprint and request that data block from source deduplication system 115.

Therefore, based on target fingerprint(s) generated by source deduplication system 115 using target fingerprint algorithm 135, and sent to target deduplication system 160 by source deduplication system 115, source deduplication system 115 receives a request from target deduplication system 160 for one or more data blocks that are new or modified. Based on this request, source deduplication system 115 sends those requested data blocks (e.g., that are new or modified) to target deduplication system 160.

In some embodiments, data block analyzer 120 can determine that certain data blocks are not new or modified (i.e., existing and unchanged). For example, a source fingerprint calculated for a data block by source fingerprint generator 125 using source fingerprint algorithm 130 can be present in source fingerprint database 215. In such circumstances, source reference generator 210 simply increments the reference count of the data block and updates source catalog 220 (e.g., to indicate that the data block is not new or modified, but has been accessed again). However, because this data block is not new or modified, there is no need to duplicate this data block to target deduplication system 160. In such cases, source deduplication system 115 simply sends the (updated) reference count of the data block to target deduplication system 160 (e.g., to update target catalog 240) as part of sending one or more data blocks that are new or modified.

Therefore, source deduplication system 115 converts or translates the source fingerprint for one or more of the data blocks that are new or modified to the target fingerprint generated using target fingerprint algorithm 135 associated with the target deduplication system 160, and performs duplication without requiring target deduplication system 160 to change its own deduplication fingerprint methodology.

Examples of Performing on the Fly Translation of Fingerprints for Duplication

Figure 3:
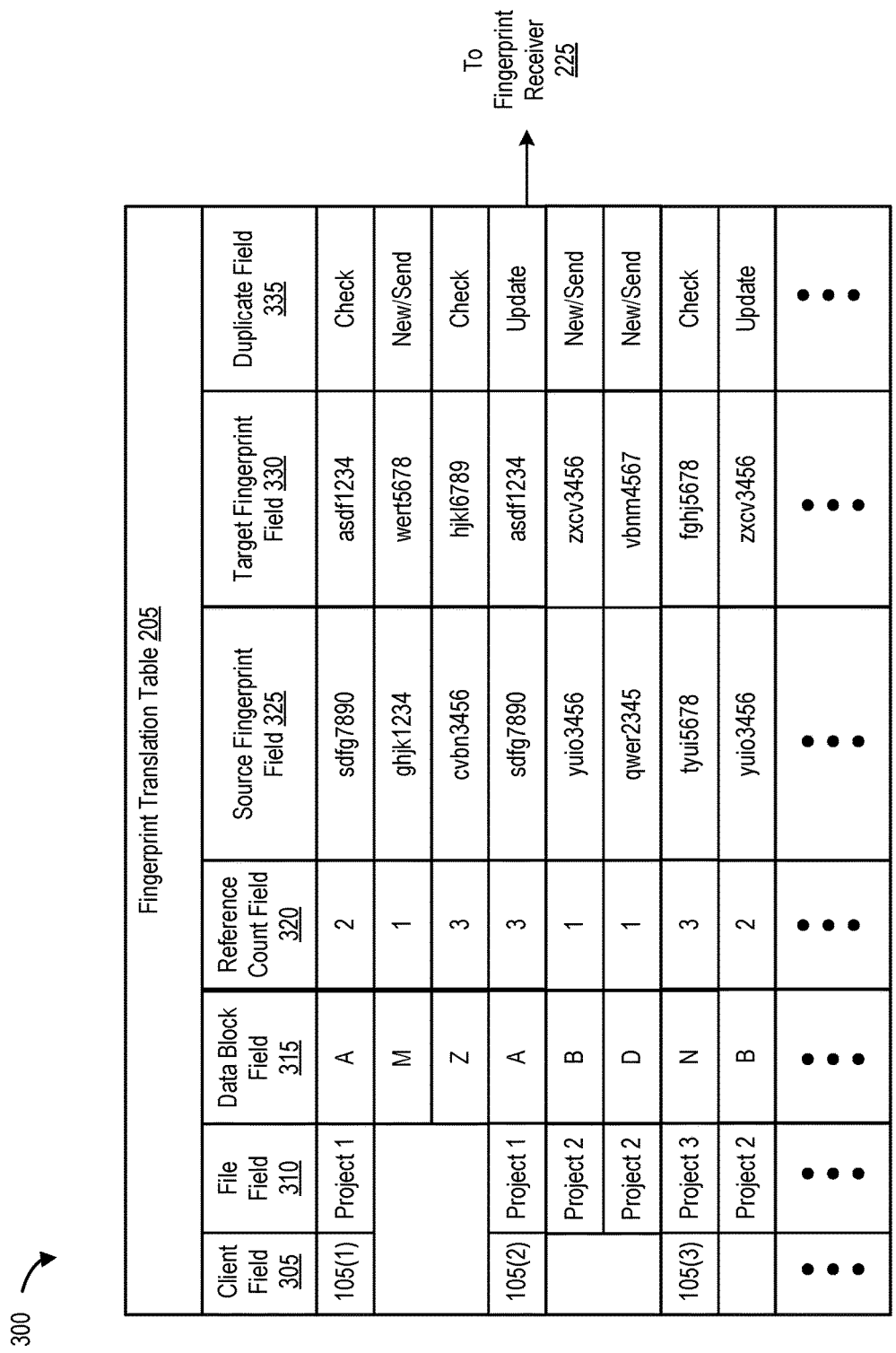
FIG. 3 is a fingerprint translation table 300, according to one embodiment of the present disclosure.

FIG. 3 is an example table 300, according to one embodiment. Fingerprint translation table 205 includes a client field 305, a file field 310, a data block field 315, a reference count field 320, a source fingerprint field 325, a target fingerprint field 330, and a duplicate field 335. In certain embodiments, fingerprint translation table 205 can be used by source deduplication system 115 to duplicate data to target deduplication system 160.

For example, client 105(1) can generate a data block A that is part of file Project 1 with a reference count of 2. Source fingerprint generator 125 first generates a source fingerprint for data block A using source fingerprint algorithm 130 (e.g., sdfg7890). If the source fingerprint for data block A is not present in source fingerprint database 215, source fingerprint generator 125 generates a target fingerprint for data block A on the fly using target fingerprint algorithm 135 (e.g., asdf1234). Source deduplication system 115 then sends fingerprint translation table 205 to target deduplication system 160 or, in certain embodiments, just sends the target fingerprint (e.g., asdf1234) to target fingerprint receiver 225 to "check" whether target deduplication system 160 has a target fingerprint in target fingerprint database 235 that matches asdf1234 (e.g., because data block A has a reference count of 2—indicating that data block A has been previously accessed, and therefore, may not be new to target deduplication system 160). As previously noted, source deduplication system 115 either receives a request for a data block that corresponds to asdf1234 from target deduplication system 160, or in certain embodiments, receives the actual/sent target fingerprint (e.g., asdf1234) back from target deduplication system 160. Source deduplication system 115 then sends or transfers data block A to target deduplication 160.

In some embodiments, it will be appreciated that fingerprint translation table 205 can be useful to keep track of data blocks that are new, thus permitting source deduplication system 115 to duplicate such a data block to target deduplication system 160 without requiring target deduplication system 160 to check whether the target fingerprint for the data block exists in target fingerprint database 235. One such example is provided with reference to data block M shown in fingerprint translation table 205.

Client 105(1) can generate a data block M that is part of a file Project 1 and has a reference count of 1. Source fingerprint generator 125 first generates a source fingerprint for data block M using source fingerprint algorithm 130 (e.g., ghjk1234). If the source fingerprint for data block M is not present in source fingerprint database 215, source fingerprint generator 125 generates a target fingerprint for data block M on the fly using target fingerprint algorithm 135 (e.g., wert5678). Source deduplication system 115 then updates fingerprint translation table 205 (e.g., duplicate field 335) to indicate that because data block M is new to source deduplication system 115, data block M is has also not been likely duplicated to target deduplication system 160. In this case, there is no need for target deduplication system 160 to check whether the target fingerprint for data block M (e.g., wert5678) is present in target fingerprint database 235. Data block M can be duplicated to target deduplication system 160 next time source deduplication system 115 performs a deduplication operation. In addition, because the target fingerprint for data block M has already been calculated by source deduplication system 115, target deduplication system 160 does not need to separately calculate the target fingerprint for data block M, thus saving valuable computing resources during duplication operations between disparate deduplication systems.

As previously noted, in addition to sending new or modified data blocks to target deduplication system 160 as part of deduplication operations, source deduplication system 115 can also send instructions to target deduplication system 160 to update the reference counts of particular data blocks that are not new or modified (e.g., for data blocks containing data that has already been encountered, and so for which a fingerprint already exists). One such example is provided with reference to data block B shown in fingerprint translation table 205. As shown in fingerprint translation table 205, data block B is part of file Project 2. Initially, data block B has a reference count of 1 and is duplicated to target deduplication system 160 based on target fingerprint zxcv3456. However, if source deduplication system 115 analyzes data block B a second time and data block B is not modified, source deduplication system 115 simply increments the reference count of data block B to 2 and instructs target deduplication system 160 to do the same. As previously noted, this update to the reference count of data block B can be sent to target deduplication system 160 as part of sending new or modified data blocks.

Therefore, in this manner, fingerprint translation table 205 can be used by source deduplication system 115 to perform on the fly fingerprint translation or conversion between source and target fingerprints for a given data block or data segment. Among various other functions, on the fly translation or conversion of source fingerprints into target fingerprints for data blocks as shown in fingerprint translation table 205 can be used to: (1) check whether a data block has been previously sent to target deduplication system 160 as part of a previous duplication operation either by source deduplication system 115 or by some other computing system, (2) send new or modified blocks to target deduplication system 160 by pre-calculating the new or modified data blocks' target fingerprints, and (3) update reference counts, target backup metadata 180 and target catalog 240 as part of performing duplication operations (e.g., so that data can be rehydrated efficiently by target deduplication system 160).

Example Processes to Duplicate Data Between Disparate Deduplication Systems

Figure 4:
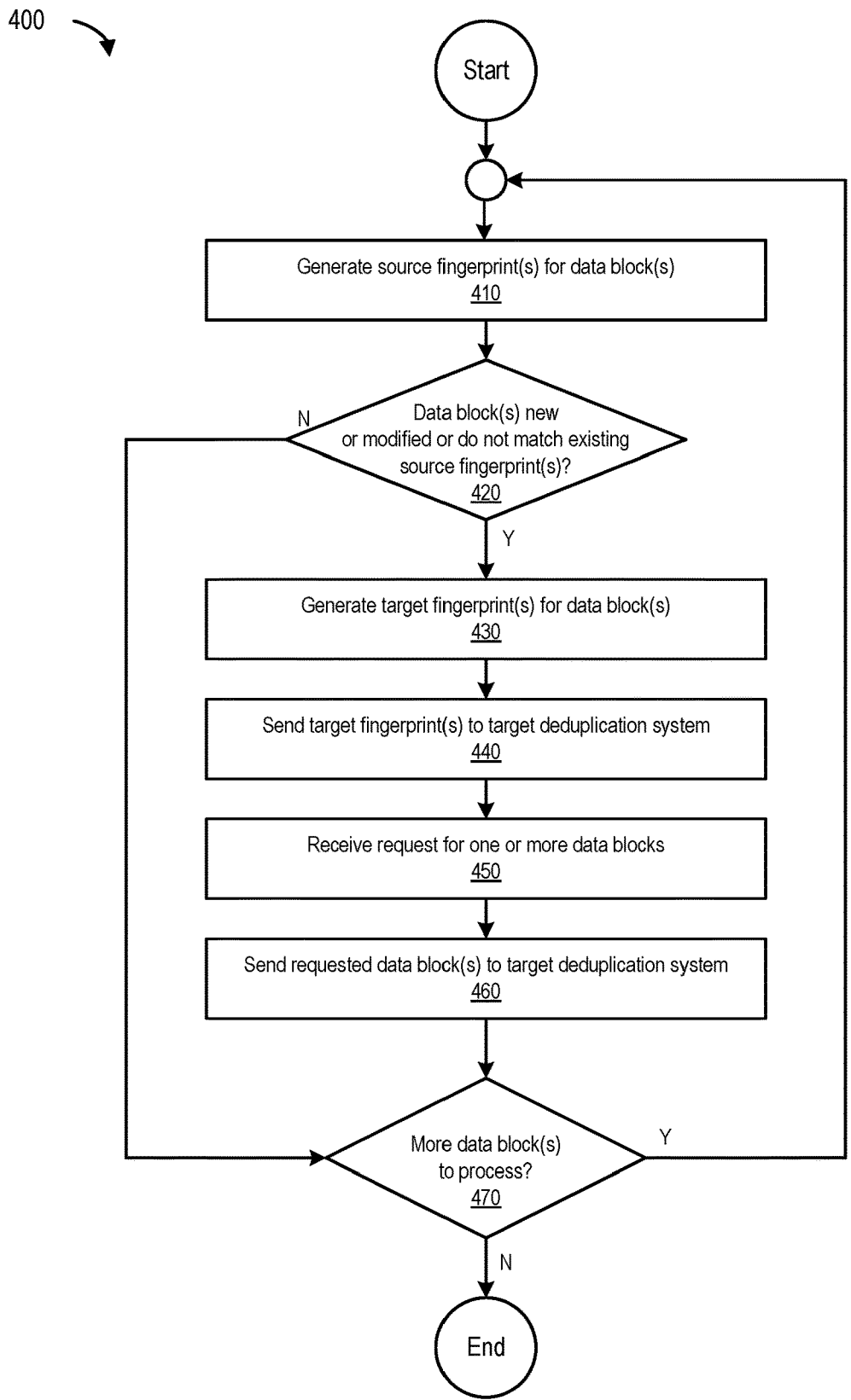
FIG. 4 is a flowchart 400 that illustrates a process for performing duplication between disparate deduplication systems, according to one embodiment of the present disclosure.

FIG. 4 is a flowchart 400 that illustrates a process for performing duplication between disparate deduplication systems, according to one embodiment. The process begins at 410 by generating source fingerprint(s) for data block(s) (e.g., data blocks received and analyzed by data block analyzer 120). At 420, the process determines whether the data block(s) are new or modified, or whether the source fingerprint(s) calculated for the data block(s) (e.g., using source fingerprint algorithm 130) do not match existing source fingerprints (e.g., previously-generated source fingerprints in source fingerprint database 215).

If the data block(s) are not new or modified, or the source fingerprint(s) calculated for the data block(s) match existing source fingerprints, the process ends (e.g., source deduplication system 160 simply increments the reference count of the data block(s) and updates source catalog 220). Otherwise, the process proceeds to 430 where target fingerprint(s) for the data block(s) are generated (e.g., using target fingerprint algorithm 135). At 440, the process sends the target fingerprint(s) to target deduplication system 440. As previously noted, the target fingerprint(s) can be sent to fingerprint receiver 225 directly (e.g., target fingerprints asdf1234, wert5678, and the like), or as part of fingerprint translation table 205, as shown in FIG. 3.

At 450, the process receives a request for one or more data blocks. As previously noted, source deduplication system 115 can receive one or more target fingerprint(s) sent to target deduplication system 160 back from target deduplication system 160, or source deduplication system 115 can receive a request for particular data blocks associated with particular target fingerprints. For example, if source deduplication system 115 sends 10 target fingerprints to target deduplication system 160, source deduplication system 115 can receive a request for data block(s) associated with target fingerprints 2, 5, and 8 (out of the 10 sent to target deduplication system 160) from target deduplication system 160. Regardless of which method is used, source deduplication system 115 can identify the data block(s) associated with the target fingerprint(s) that are not part of target fingerprint database 235 (e.g., as determined by target deduplication system 160).

At 460, the process sends (e.g., transmits or copies) the requested data block(s) to target deduplication system 160. At 470, the process determines whether there are additional data block(s) to process. If there are more data blocks to process, the process loops back to 410. Otherwise, the process ends.

Figure 5:
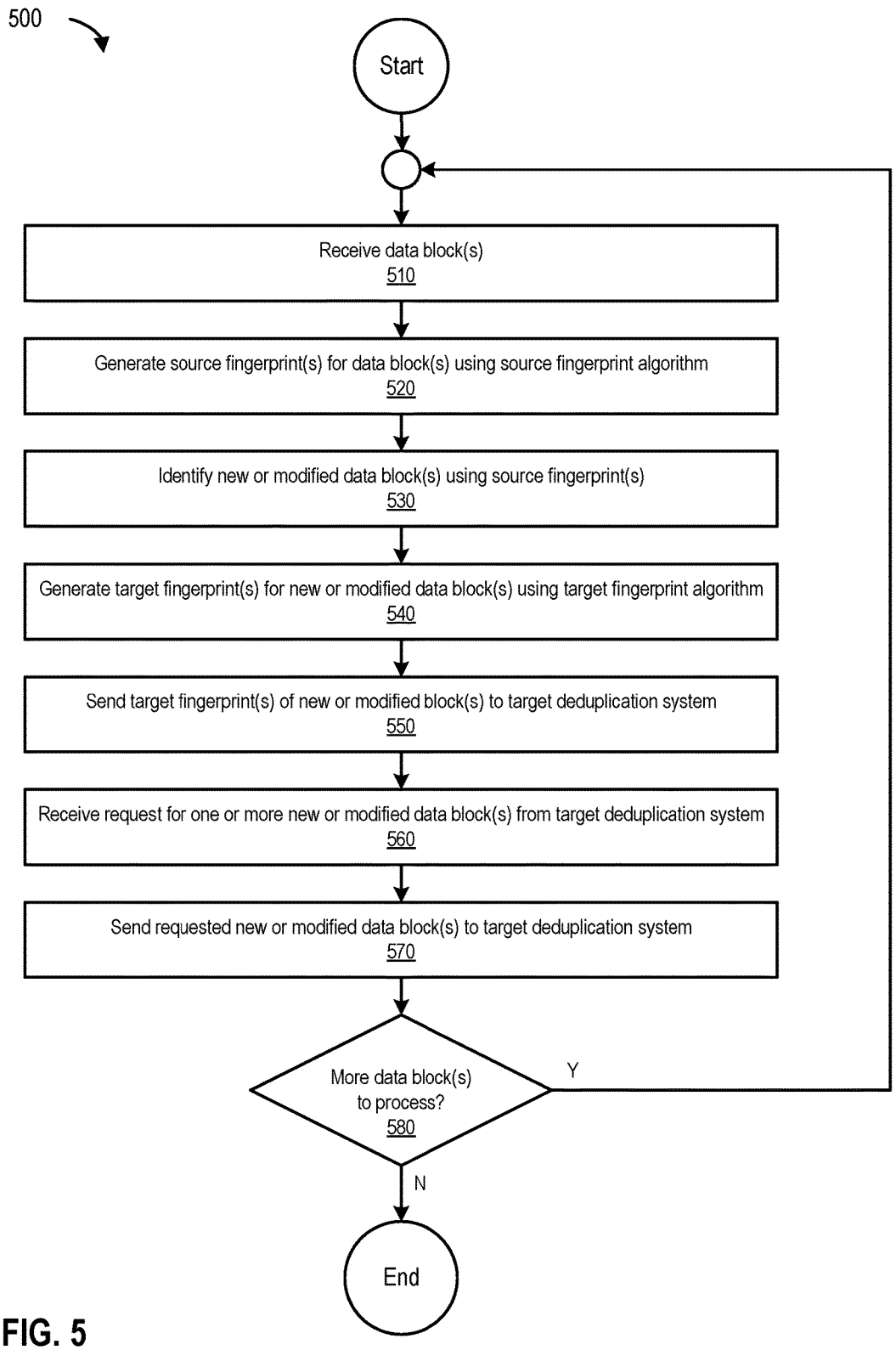
FIG. 5 is a flowchart 500 that illustrates a process for sending target fingerprints from a source deduplication system to a target deduplication system, according to one embodiment of the present disclosure.

FIG. 5 is a flowchart 500 that illustrates a process for sending target fingerprints from a source deduplication system to a target deduplication system, according to one embodiment. The process begins at 510 by receiving data block(s) (e.g., from clients 105(1)-(N)). At 520, the process generates source fingerprints(s) for the data block(s) using source fingerprint algorithm 130. In this example, source fingerprint algorithm 130 is a native or internal fingerprint algorithm of source deduplication system 115 and is used by source deduplication system 115 to perform data deduplication operations.

At 530, the process identifies new or modified data block(s) using the source fingerprint(s) (e.g., by comparing source fingerprint(s) to previously-generated source fingerprint(s) in source fingerprint database 215 to determine if there is a match). At 540, the process generates target fingerprint(s) for new or modified data block(s) using target fingerprint algorithm 135 (e.g., a non-native and different fingerprint algorithm).

At 550, the process sends the target fingerprint(s) of new or modified blocks to target deduplication system 160 (e.g., either on their own or as part of fingerprint translation table 205). At 560, the process receives a request for one or more new or modified data blocks from target deduplication system 160. The process receives such a request only if target deduplication system 160 determines that the one or more new or modified data blocks are not present in target fingerprint database 235. If the one or more new or modified data blocks were determined by target deduplication system 160 to be present in target fingerprint database 235, then such a request would simply request metadata associated with those one or more data blocks (e.g., (updated) reference counts, and the like) from source deduplication system 115 (e.g., so that target deduplication system 160 can update target catalog 240 with the latest information about the one or more data blocks for efficient rehydration of data).

At 570, the process sends the requested new or modified data block(s) to target deduplication system 160. As previously noted, the request from target deduplication 160 can simply include a list of previously-sent target fingerprints that are not present in target fingerprint database 235. Alternatively, the request can identify and request data block(s) associated with a subset of target fingerprint(s) of target fingerprint(s) sent to target deduplication system 160 by source deduplication system 115). At 580, the process determines whether there are more data block(s) to process. If there are more data blocks to process, the process loops back to 510. Otherwise, the process ends.

Figure 6:
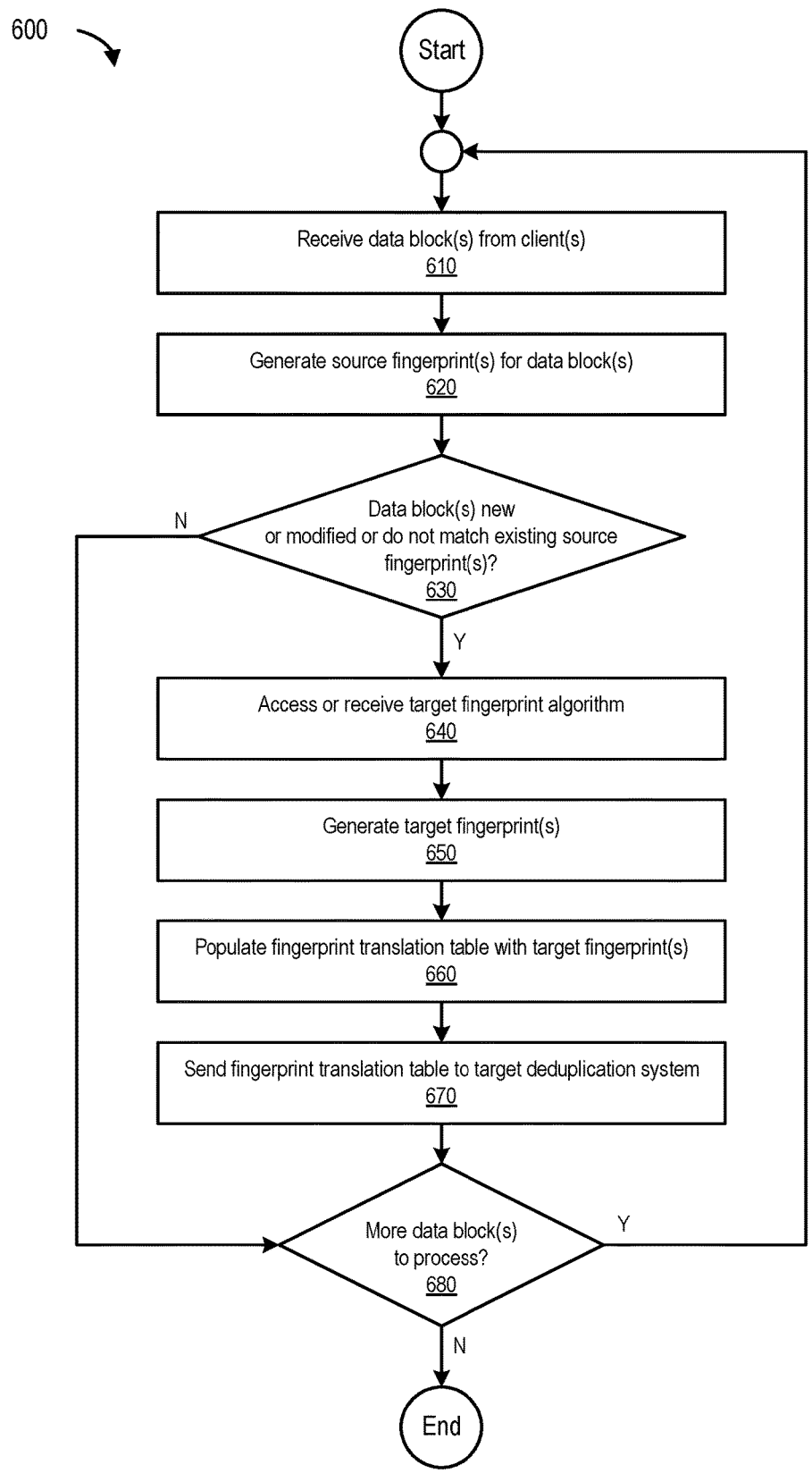
FIG. 6 is a flowchart 600 that illustrates a process for sending a fingerprint translation table from a source deduplication system to a target deduplication system, according to one embodiment of the present disclosure.

FIG. 6 is a flowchart 600 that illustrates a process for sending a fingerprint translation table from a source deduplication system to a target deduplication system, according to one embodiment. The process begins at 610 by receiving data blocks from clients (e.g., clients 105(1)-(N)). At 620, the process generates source fingerprint(s) for the data block(s). At 630, the process determines whether the data block(s) are new or modified, or whether the source fingerprint(s) calculated for the data block(s) (e.g., using source fingerprint algorithm 130) matches existing source fingerprints (e.g., previously-generated source fingerprints in source fingerprint database 215).

If the data block(s) are not new or modified, or the source fingerprint(s) calculated for the data block(s) match existing source fingerprints, the process ends (e.g., source deduplication system 160 simply increments the reference count of the data block(s) and updates source catalog 220). However, if the data block(s) are new or modified, or the source fingerprint(s) calculated for the data block(s) do not match existing source fingerprints, the process, at 640, accesses or receives target fingerprint algorithm 135 (e.g., from target deduplication system 160 or some other computing system communicatively coupled to network 185).

At 650, the process generates target fingerprint(s) for data block(s) is they are new or modified, or if the data block(s) do not match existing source fingerprint(s). At 660, the process populates fingerprint translation table 205 with target fingerprint(s) (e.g., as shown in FIG. 3). At 670, the process sends fingerprint translation table 205 to target deduplication system 160. At 680, the process determines whether there are more data block(s) to process. If there are more data blocks to process, the process loops back to 610. Otherwise, the process ends.

Figure 7:
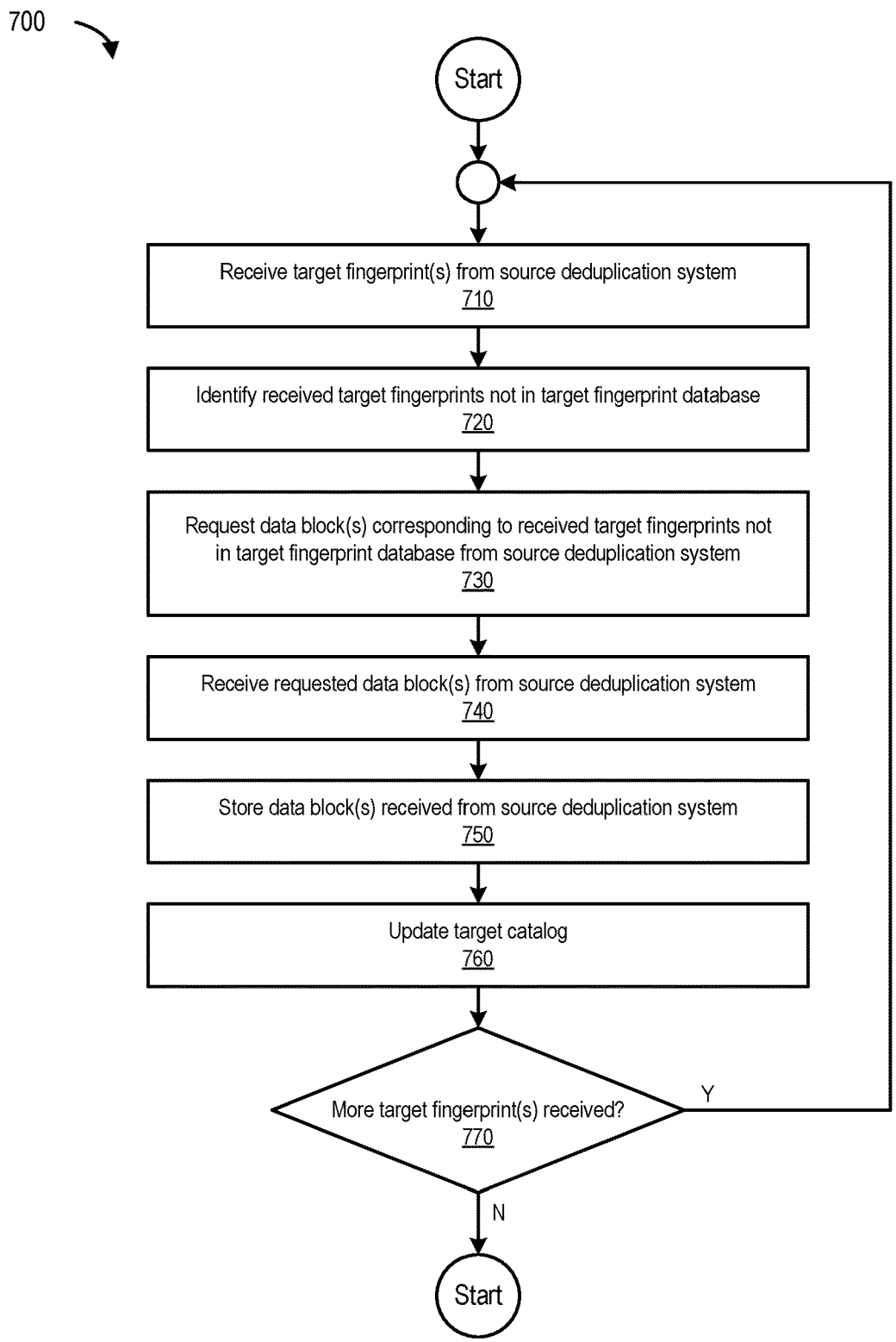
FIG. 7 is a flowchart 700 that illustrates a process for receiving target fingerprints from a source deduplication system at a target deduplication system, according to one embodiment of the present disclosure.

FIG. 7 is a flowchart 700 that illustrates a process for receiving target fingerprints from a source deduplication system at a target deduplication system, according to one embodiment. The process begins at 710 by receiving target fingerprint(s) from source deduplication system 115 (e.g., on their own or as part of fingerprint translation table 205). At 720, the process identifies received target fingerprint(s) not in target fingerprint database 235. At 730, the process requests data block(s) corresponding to received target fingerprint(s) not in target fingerprint database 235 from source deduplication system 160 (e.g., by sending back target fingerprint(s) not in target fingerprint database 235 to source deduplication system 160).

At 740, the process receives the requested data block(s) from source deduplication system 115. At 750, the process stores the data block(s) received from source deduplication system 115 (e.g., on target backup device 170), and at 760, updates target catalog 240. At 770, the process determines whether there are more target fingerprint(s) received from source deduplication system 115. If there are more target fingerprint(s) received, the process loops back to 710. Otherwise, the process ends.

Example Computing System

Figure 8:
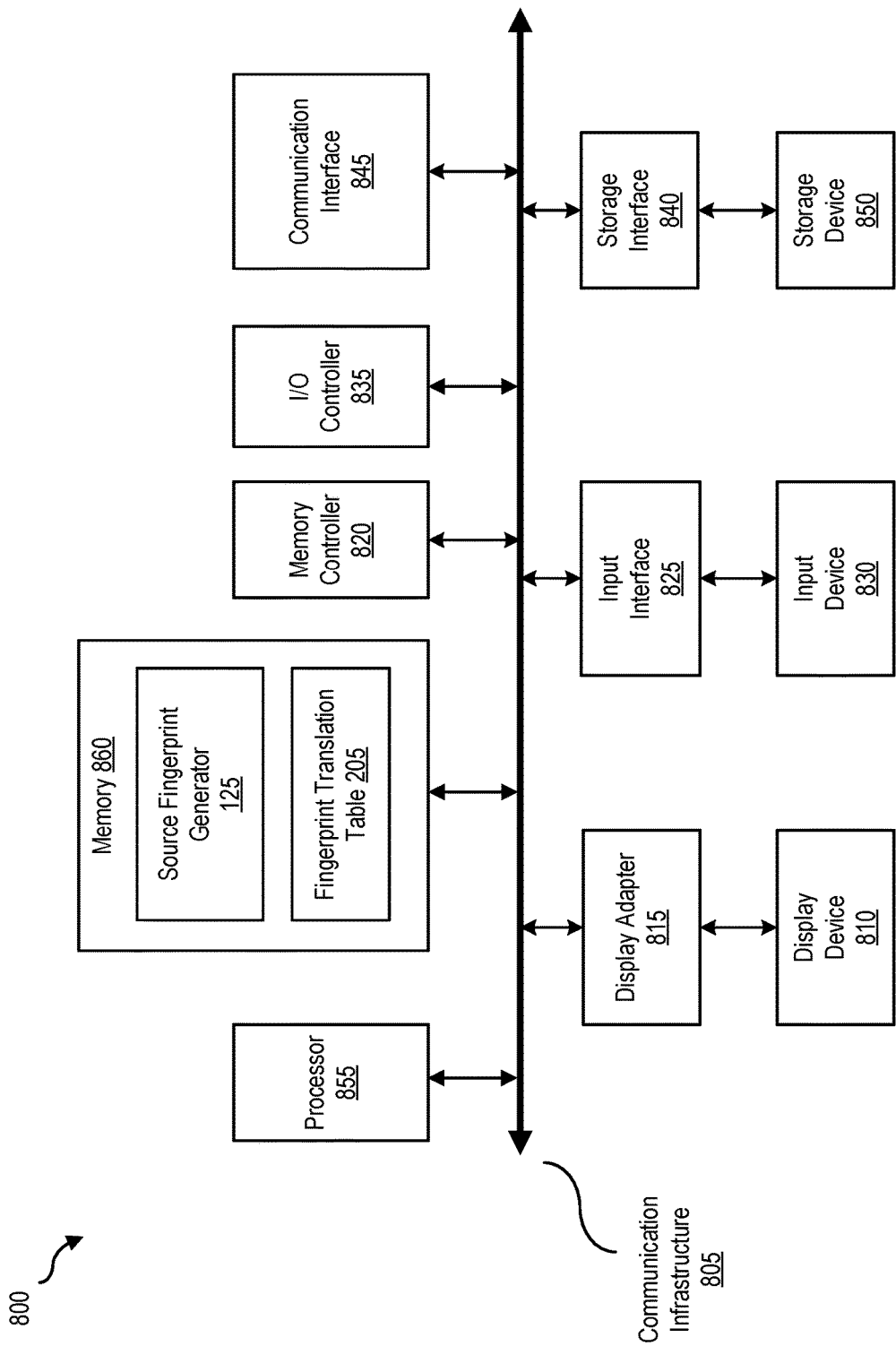
FIG. 8 is a block diagram of a computing system 800 that facilitates shared services between deduplication systems, according to one embodiment of the present disclosure.

FIG. 8 is a block diagram of a computing system 800 that facilitates duplication and/or data migration between disparate deduplication systems, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that implements source deduplication system 115 and/or target deduplication system 160, computing system 800 becomes a special purpose computing device that is configured to duplicate data between disparate deduplication systems.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein.

Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a source fingerprint generator 125 and/or a fingerprint translation table 205 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtualization server and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 and/or various portions of storage device 850. When executed by processor 855, a computer program loaded into computing system 800 may cause processor 855 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking System

Figure 9:
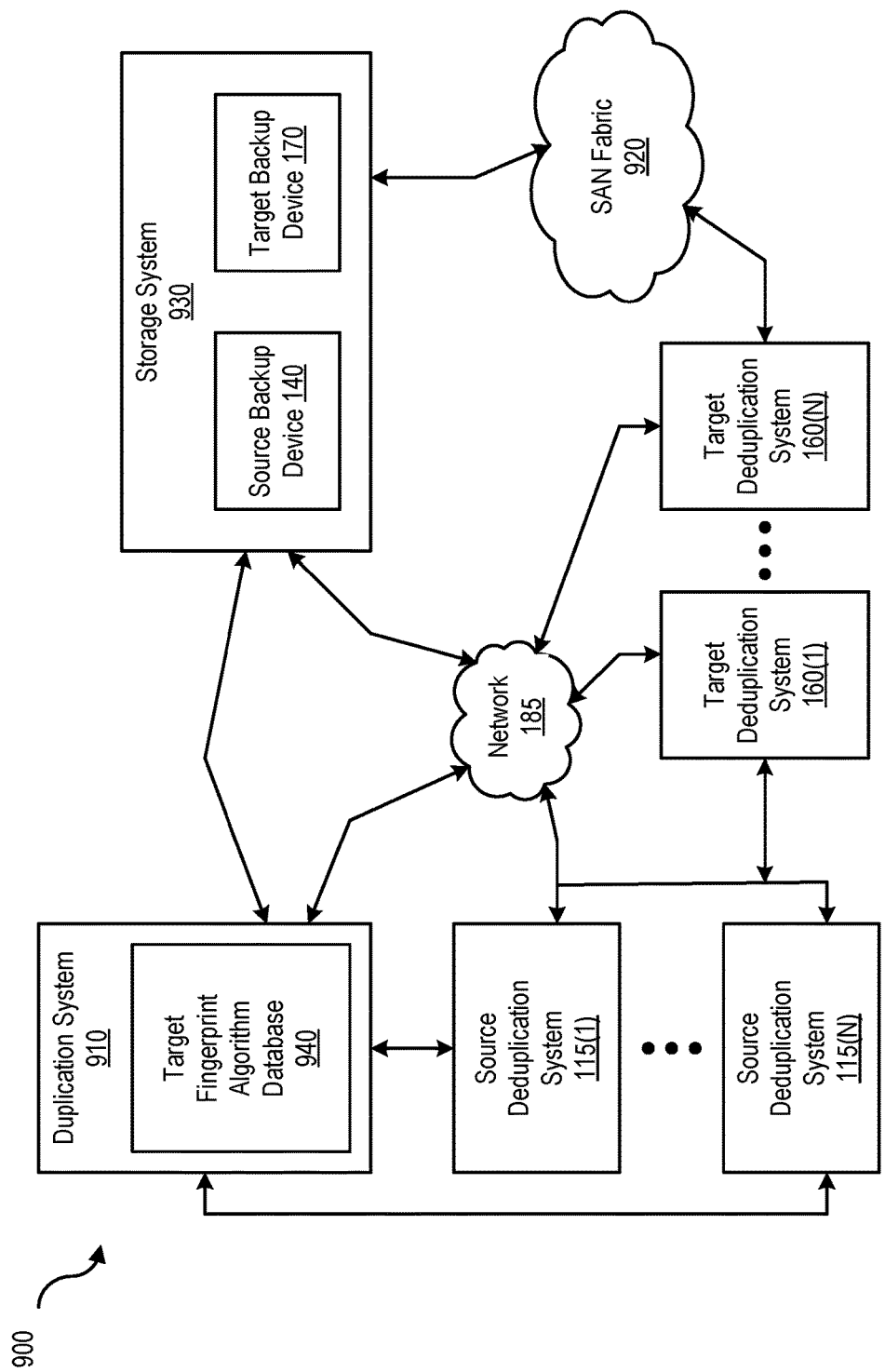
FIG. 9 is a block diagram of a networking system 900, according to one embodiment of the present disclosure.

FIG. 9 is a block diagram of a networking system 900, according to one embodiment. In certain embodiments, network-attached storage (NAS) devices may be configured to communicate with source deduplication systems 115(1)-(N) and/or target deduplication systems 160(1)-(N) using various protocols, such as Network File System (NFS), Server Message Block (SMB), or Common Internet File System (CIFS). Network 185 generally represents any type or form of computer network or architecture capable of facilitating communication between source deduplication systems 115(1)-(N) and/or target deduplication systems 160(1)-(N). In certain embodiments, a communication interface, such as communication interface 845 in FIG. 8, may be used to provide connectivity between source deduplication systems 115(1)-(N) and/or target deduplication systems 160(1)-(N), and network 185. It should be noted that the embodiments described and/or illustrated herein are not limited to the Internet or any particular network-based environment. For example, network 185 can be a Storage Area Network (SAN).

In one embodiment, all or a portion of one or more of the disclosed embodiments may be encoded as a computer program and loaded onto and executed by the duplication system 910, source deduplication systems 115(1)-(N), and/or target deduplication systems 160(1)-(N), or any combination thereof. All or a portion of one or more of the embodiments disclosed herein may also be encoded as a computer program, stored on duplication system 910, source deduplication systems 115(1)-(N), and/or target deduplication systems 160(1)-(N), and distributed over network 185. In some examples, all or a portion of duplication system 910, source deduplication systems 115(1)-(N), and/or target deduplication systems 160(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, duplication system 910, source backup server 110, and/or target backup server 155 may transform the behavior of source deduplication systems 115(1)-(N) and/or target deduplication systems 160(1)-(N) in order to cause source deduplication systems 115(1)-(N) and/or target deduplication systems 160(1)-(N) to perform duplication and/or data migration between disparate deduplication systems.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   in response to a determination that a fingerprint of a data block does not match any of a plurality of existing source fingerprints,
      generating a target fingerprint for data block using a target fingerprint algorithm associated with a target deduplication system;
   receiving the target fingerprint at the target deduplication system, wherein the fingerprint and the plurality of existing source fingerprints were generated at a source deduplication system using a source fingerprint algorithm;

determining whether the target fingerprint exists in a target fingerprint database, wherein
the target fingerprint database comprises a plurality of target fingerprints generated using the target fingerprint algorithm; and in response to a determination that the target fingerprint does not exist in the target fingerprint database, sending a request to the source deduplication system, wherein
the request is a request for the source deduplication system to send the data block to the target deduplication system.

2. The method of claim 1, further comprising:
receiving a fingerprint translation table at the target deduplication system, wherein
the fingerprint translation table comprises
one or more source fingerprints, and
one or more target fingerprints, corresponding to the one or more source fingerprints,
the one or more source fingerprints comprise the fingerprint, and
the one or more target fingerprints comprise the target fingerprint.

3. The method of claim 2, further comprising:
identifying at least one target fingerprint not in the fingerprint translation table, wherein
the fingerprint translation table comprises
a plurality of source fingerprints, and
a plurality of target fingerprints, corresponding to the plurality of source fingerprints,
the plurality of target fingerprints comprises the at least one target fingerprint,
the plurality of source fingerprints comprise the one or more source fingerprints, and
the plurality of target fingerprints comprise the one or more target fingerprints.

4. The method of claim 3, further comprising:
sending at least one source fingerprint to the source deduplication system, wherein
the fingerprint translation table indicates that the at least one source fingerprint corresponds to the at least one target fingerprint.

5. The method of claim 3, further comprising:
identifying one or more data blocks corresponding to the at least one target fingerprint;
generating at least one source fingerprint for the one or more data blocks using the source fingerprint algorithm; and
sending the at least one source fingerprint to the source deduplication system.

6. The method of claim 3, further comprising:
sending the at least one target fingerprint to the source deduplication system; and
associating the at least one target fingerprint with one or more data blocks corresponding to the at least one target fingerprint, at the source deduplication system.

7. The method of claim 1, further comprising:
receiving a fingerprint translation table at the target deduplication system, wherein
the fingerprint translation table comprises
a plurality of target fingerprints; and
receiving one or more target fingerprints, wherein
the one or more target fingerprints comprise the target fingerprint.

8. The method of claim 7, wherein
identifying at least one target fingerprint, wherein
the at least one target fingerprint is identified by virtue of the at least one target fingerprint not being in the fingerprint translation table.

9. The method of claim 8, wherein the identifying comprises:
comparing each fingerprint of the one or more target fingerprints to each fingerprint of
the plurality of target fingerprints, wherein
the fingerprint translation table further comprises
a plurality of source fingerprints, corresponding to the one or more target fingerprints; and
in response to the each fingerprint of the one or more target fingerprints not matching any of the plurality of target fingerprints, identifying a fingerprint corresponding to the each fingerprint as the at least one target fingerprint, using the fingerprint translation table.

10. The method of claim 9, further comprising:
sending a request to the source deduplication system, wherein
the request is a request for at least one data block corresponding to the at least one target fingerprint.

11. A storage device comprising:
a non-transitory computer-readable storage medium, wherein
a plurality of instructions are encoded in the non-transitory computer-readable storage medium; and
the plurality of instructions, comprising
a first set of instructions, executable on a computer system, configured to receive a target fingerprint from a source deduplication system, wherein
the computer system is configured to implement a target deduplication system,
the target fingerprint was generated for a data block, using a target fingerprint algorithm associated with the target deduplication system,
the target fingerprint is received at the target deduplication system as a result of a determination that a fingerprint of the data block did not match any of a plurality of existing source fingerprints, and
the fingerprint and the plurality of existing source fingerprints were generated using a source fingerprint algorithm associated with the source deduplication system,
a second set of instructions, executable on the computer system, configured to determine whether the target fingerprint exists in a target fingerprint database, wherein
the target fingerprint database comprises a plurality of target fingerprints, and
the target fingerprints were generated using the target fingerprint algorithm, and
a third set of instructions, executable on the computer system, configured to, in response to a determination that the target fingerprint does not exist in the target fingerprint database, send a request to the source deduplication system, wherein
the request is a request for the source deduplication system to send the data block to the target deduplication system.

12. The storage device of claim 11, wherein the instructions further comprise:
a fourth set of instructions, executable on the computer system, configured to receive a fingerprint translation table at the target deduplication system, wherein
the fingerprint translation table comprises one or more source fingerprints, and
one or more target fingerprints, corresponding to the one or more source fingerprints,
the one or more source fingerprints comprise the fingerprint, and
the one or more target fingerprints comprise the target fingerprint.

13. The storage device of claim 12, wherein the instructions further comprise:
a fifth set of instructions, executable on the computer system, configured to identify at least one target fingerprint not in the fingerprint translation table, wherein
the fingerprint translation table comprises
a plurality of source fingerprints, and
a plurality of target fingerprints, corresponding to the plurality of source fingerprints,
the plurality of target fingerprints comprises the at least one target fingerprint,
the plurality of source fingerprints comprise the one or more source fingerprints, and
the plurality of target fingerprints comprise the one or more target fingerprints.

14. The storage device of claim 13, wherein the instructions further comprise:
a sixth set of instructions, executable on the computer system, configured to send at least one source fingerprint to the source deduplication system, wherein
the fingerprint translation table indicates that the at least one source fingerprint corresponds to the at least one target fingerprint.

15. The storage device of claim 13, wherein the instructions further comprise:
a sixth set of instructions, executable on the computer system, configured to identify one or more data blocks corresponding to the at least one target fingerprint;
a seventh set of instructions, executable on the computer system, configured to generate at least one source fingerprint for the one or more data blocks using the source fingerprint algorithm; and
an eighth set of instructions, executable on the computer system, configured to send the at least one source fingerprint to the source deduplication system.

16. The storage device of claim 13, wherein the instructions further comprise:
a sixth set of instructions, executable on the computer system, configured to send the at least one target fingerprint to the source deduplication system; and
a seventh set of instructions, executable on the computer system, configured to cause the at least one target fingerprint to be associated with one or more data blocks corresponding to the at least one target fingerprint, at the source deduplication system.

17. A computer system comprising:
one or more processors;
a computer-readable storage medium coupled to the one or more processors; and
a plurality of instructions, encoded in the computer-readable storage medium and configured to cause the one or more processors to
receive a target fingerprint from a source deduplication system, wherein
the computer system is configured to implement a target deduplication system,
the target fingerprint was generated for a data block, using a target fingerprint algorithm associated with the target deduplication system,
the target fingerprint is received at the target deduplication system as a result of a determination that a fingerprint of the data block did not match any of a plurality of existing source fingerprints, and
the fingerprint and the plurality of existing source fingerprints were generated using a source fingerprint algorithm associated with the source deduplication system,
determine whether the target fingerprint exists in a target fingerprint database, wherein
the target fingerprint database comprises a plurality of target fingerprints, and
the target fingerprints were generated using the target fingerprint algorithm, and
in response to a determination that the target fingerprint does not exist in the target fingerprint database, send a request to the source deduplication system, wherein
the request is a request for the source deduplication system to send the data block to the target deduplication system.

18. The computer system of claim 17, wherein the plurality of instructions is further configured to cause the one or more processors to:
receive a fingerprint translation table at the target deduplication system, wherein
the fingerprint translation table comprises
one or more source fingerprints, and
one or more target fingerprints, corresponding to the one or more source fingerprints,
the one or more source fingerprints comprise the fingerprint, and
the one or more target fingerprints comprise the target fingerprint.

19. The computer system of claim 18, wherein the plurality of instructions is further configured to cause the one or more processors to:
identify at least one target fingerprint not in the fingerprint translation table, wherein
the fingerprint translation table comprises
a plurality of source fingerprints, and
a plurality of target fingerprints, corresponding to the plurality of source fingerprints,
the plurality of target fingerprints comprises the at least one target fingerprint,
the plurality of source fingerprints comprise the one or more source fingerprints, and
the plurality of target fingerprints comprise the one or more target fingerprints.

20. The computer system of claim 19, wherein the plurality of instructions is further configured to cause the one or more processors to:
send at least one source fingerprint to the source deduplication system, wherein
the fingerprint translation table indicates that the at least one source fingerprint corresponds to the at least one target fingerprint.

* * * * *